MUSICAL INSTRUMENT

Original Filed Aug. 5, 1949 2 Sheets-Sheet 1

INVENTOR:
MERWIN J. LARSEN
BY
James A. Koehl
ATT'Y

MUSICAL INSTRUMENT

Original Filed Aug. 5, 1949 2 Sheets-Sheet 2

INVENTOR:
MERWIN J. LARSEN
BY James A. Koehler
ATT'Y

Reissued June 12, 1951

Re. 23,376

UNITED STATES PATENT OFFICE 23,376

MUSICAL INSTRUMENT

Merwin J. Larsen, Villa Park, Ill., assignor, by mesne assignments, to Central Commercial Industries, Inc., Chicago, Ill., a corporation of Delaware Original No. 2,545,665, dated March 20, 1951, Serial No. 108,706, August 5, 1949. Application for reissue April 10, 1951, Serial No. 220,187

21 Claims. (Cl. 84—1.19)

Figure 1:
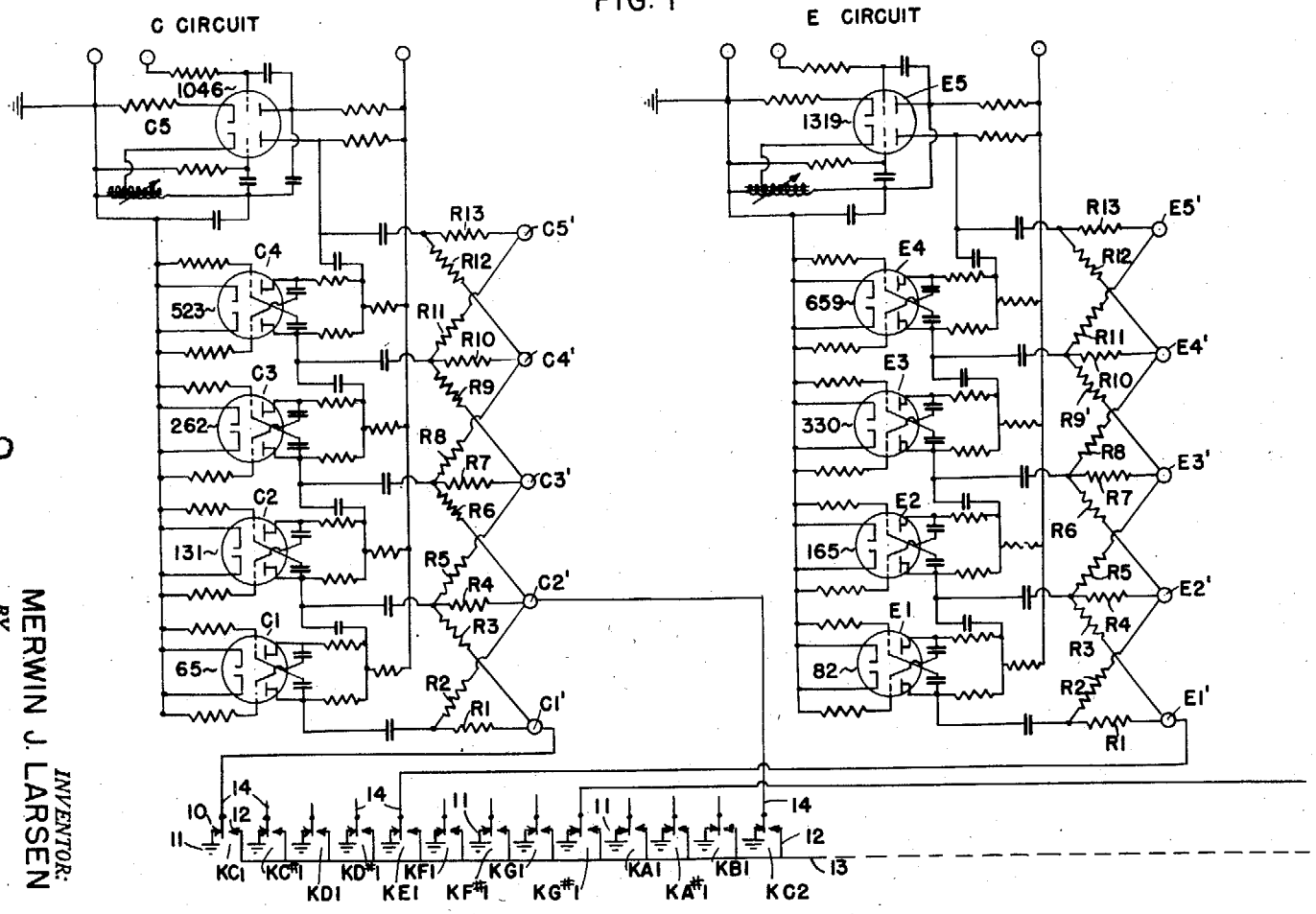

Matter enclosed in heavy brackets [ ] appears in the original patent but forms no part of this reissue specification; matter printed in italics indicates the additions made by reissue.

This invention relates to electrical musical instruments of the class employing sources producing complex audio signals at the tone frequencies of different notes of the chromatic scale, which signals are adapted to be selectively translated into audible sounds in response to actuation of the playing-keys of a keyboard. An instrument of this class is fully disclosed in Letters Patent of the United States, No. 2,403,090, granted to me on July 2, 1946.

In the aforementioned Letters Patent, the signal sources consist of high vacuum tubes, the complex output waves of which are conducted to wave filters by means of which they are repeated as waves of different harmonic composition and then impressed on the input circuit of an electroacoustical translating device and reproduced as audible sounds of different timbre.

An essential object of the invention is the provision of an organization of elements for producing pleasing sustained tones by an exceedingly simple and inexpensive system of transmission and keying-circuits.

The herein disclosed embodiment of my invention employs sixty sources respectively providing tone frequencies embracing a range of five octaves, such that the lowest fundamental frequency is approximately 65. cycles per second. In organ nomenclature this range of sequential frequencies is known as a basic 8-foot stop. Most pipe organs embody what are known as couplers. These are designed so that tones in given frequency relation are available in different combinations, i. e. the basic 8-foot tone can be coupled to a tone which may either be a 4-foot tone an octave above said basic tone or a 16-foot tone an octave below said basic tone. With the organ, the player can selectively draw one or more coupler "stops" as may prove most useful for musical expression.

It is well known that when a tone of a given fundamental pitch is coupled to tones of other given pitch, the combination or resultant tone is more brilliant and has body the single tone lacks. While a feature of the invention is a simple and inexpensive method of coupling octavely related tones, the invention is not limited in this respect, for the reason that by very similar methods of coupling given frequency sources with each other, tones can be produced that are comparable to various mixture stops of an organ. For example the stop known as the manual quint 5½-foot which sounds a fifth above the normal pitch of an 8-foot stop, or the octave quint which sounds a twelfth above an 8-foot stop can be very readily obtained.

In an electrical musical instrument the addition of selectively actuable coupler and mixture stops entails an expense that is prohibitive in an inexpensive instrument, and it is therefore a further object of my invention to provide a simple system or method of permanently coupling to each other tones in any given pitch relation so that the resultant tones are more or less comparable to tones produced by more expensive instruments.

A still further object is the provision of a simple and inexpensive coupling system for electrical musical instruments whereby tonal balance or necessary tapering of the relative amplitudes of tones is assured from top to bottom of the gamut, regardless of the pitch relation of individual tones comprising any given combination of tones.

A still further object is the provision of a system adapted to be embodied as integral parts of circuits of the various cascades of electron discharge devices employed herein for producing complex waveforms at different tone frequencies and by means of which there will be no "robbing" amongst frequencies drawn simultaneously from any single electron discharge device.

Figure 1A:
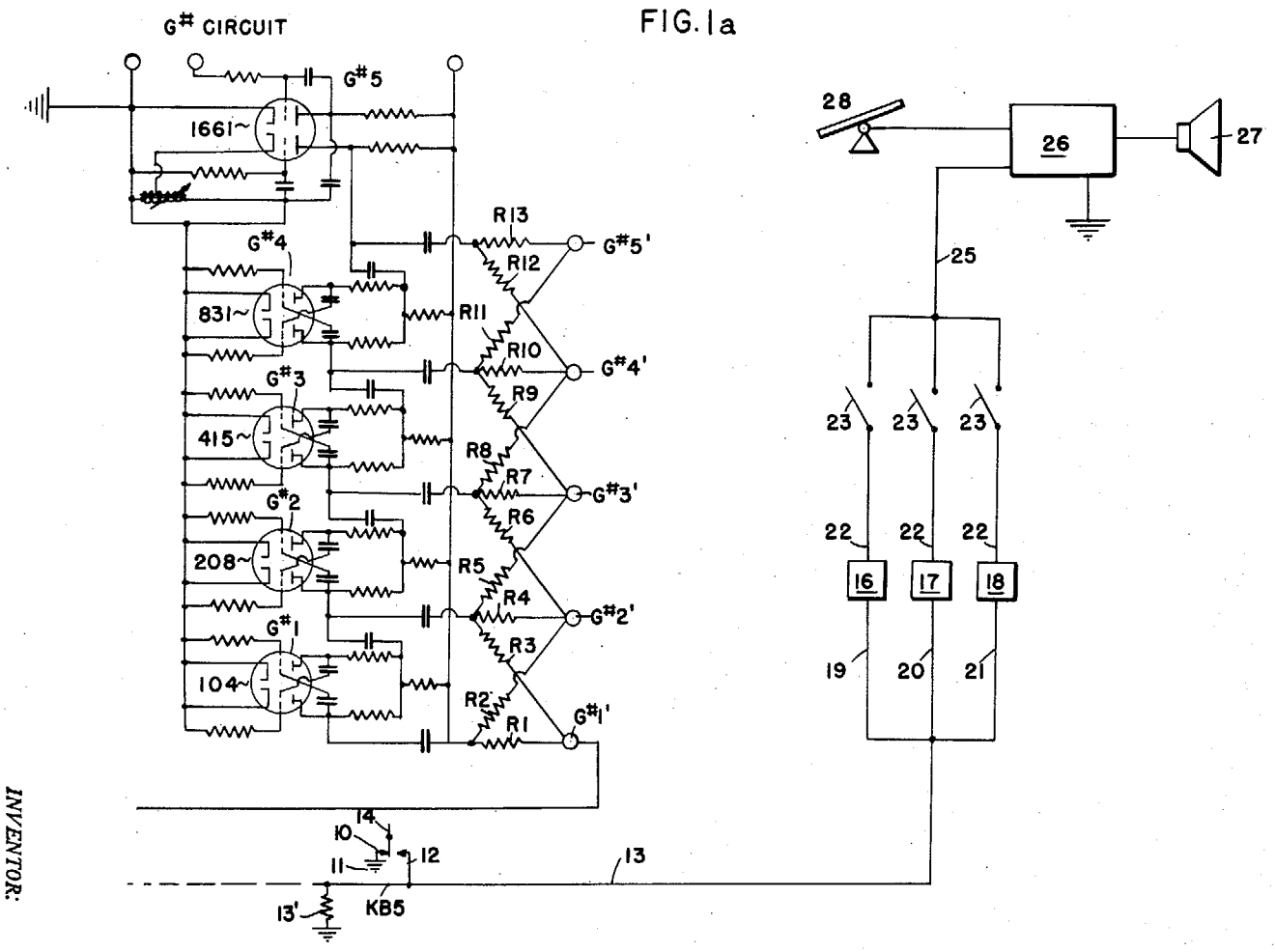

The novel features of my invention are set forth with particularity in the herein appended claims. The invention, however, both as to the organization of elements employed and the method of operation, together with additional objects and advantages will be fully understood from the following description of a specific embodiment of the invention taken in connection with the accompanying drawings, in which :

The drawing is a schematic view of the invention, in which Figures 1 and 1a are continuations of a common electrical network when the figures are arranged to dispose Figure 1a at the right of Figure 1.

In the produtcion of musical tones from tone frequency sources or generators producing waveforms of audio signals which are rich in harmonics, it is customary to draw on one such source or generator only for each basic note and to employ, in addition thereto, switching means to draw upon sources or generators having octavely related (or other multiple) frequencies. For example, in pipe and electronic organs, 8-foot tones are keyed by means of straight-forward connections to sources or generators, the output frequencies of which correspond in number to the vibration frequencies of notes associated with the different playing-keys of a keyboard.

4-foot tones are produced by selectively drawing frequencies from sources or generators one octave higher than the basic 8-foot tones. 16-foot tones are produced by other switching means which draw upon sources or generators having frequencies one octave lower than the basic 8-foot tone. Similar coupling switches can also be arranged to draw upon sources or generators producing 2-foot tones (two octaves higher) or 2⅔-foot tones can be produced by connections to sources or generators having frequencies nearest the third harmonic of the basic 8-foot tone, and so on. In carrying my invention into practice, resort can be had to any of these coupling methods, and for the broad purpose of my invention, the term "coupling" as used herein shall not be limited to the coupling of octavely related frequencies.

In order to produce a low-cost instrument with the maximum richness of tone, it is expedient in one embodiment of my invention to permanently connect, in a special manner, the 4-foot and the 16-foot tones with the basic 8-foot tones, thereby eliminating otherwise expensive selective switching and involved or complicated wiring and cabling. To couple both 16-foot and 4-foot tones to 8-foot tones from top to bottom of a keyboard having a range of five octaves would require a number of sources which would be greater than the number of playing-keys of a five octave keyboard. In the instant embodiment of my invention, use is made of only sixty sources or generators embracing a frequency range of five octaves, and by tapering the amplitudes of the 16-foot outputs supplied to the next-to-lowest octave keys and similarly tapering the amplitudes of the 4-foot outputs supplied to the next-to-highest octave keys, and omitting the 16-foot coupling in the bottom octave and the 4-foot coupling in the top octave, highly satisfactory results are obtained, such that to the average ear it is difficult to discern the difference between this system of coupling and the more expensive system in which for each key in said keyboard there are three distinctive tones at octave separation.

In the accompanying drawing, it is assumed that the keyboard of the instrument has sixty playing-keys and that each separate key operates a single electric switch. Fourteen of these switches are shown and respectively designated KC1, KC#1–KC2 and KC5. Each separate switch comprises a fixed contact element 10 connected to ground 11, a fixed contact element 12 connected to a common output conductor 13 and a movable contact element 14, the latter co-active with the key so that when the key is fully elevated, the switch is "off" and contact element 14 is engaged with element 10 so that the current flow is to ground. Said common conductor 13 is connected to ground by a resistor 13' of 4.7 K. When the key is depressed, the movable contact element 14 engages contact element 12 and the switch is "on." The output conductor 13 connects all of said switches with a filtering system for producing a number of tone qualities. This system consists of filters 16, 17 and 18, connected by branch paths 19, 20 and 21 to said common conductor 13. The output leads 22 from said filters are each thereof provided with a control switch 23. These leads connect at 24 to the input lead 25 of an audio amplifier 26 in the output circuit of which is a loud speaker 27. The input circuit of the amplifier is provided with any well known volume control device 28.

[The term "generator" as used herein shall mean any well known electronic or electrical device or source adapted to produce an output wave which is rich in harmonics as distinguished from a single or sinusoidal wave.]

*The term "generator" as used herein shall mean any well known electronic or electrical device or source adapted to produce an output wave which is rich in harmonics as distinguished from a sinusoidal wave or a wave containing say, only the odd harmonics. A complex wave or one which is rich in harmonics shall be construed to mean a wave obtained preferably from a multivibrator or any other well known equivalent audio signal source producing a complex wave consisting of a long series of both even and odd harmonics.* Systems of this class are shown in the patent to Larsen et al. No. 2,410,883 and are entirely dependable for the purpose of my invention. Said system consists of a plurality of sets of high vacuum tubes in which the tubes of each set are connected in cascade and function as frequency dividers, i. e. assuming that the frequency of stage C1 of the C cascade is 1046, c/s, the frequencies of the successive, (controlled) stages of said C cascade will be 523., 262., 131., and 65. c/s. In this manner, the outputs of the respective stages of each and every cascade will be at octavely related frequencies. While the frequencies are not divided exactly by a factor of 2 for each stage, the division is sufficiently accurate for all practical purposes.

In my Patent No. 2,403,090 twelve similar divider circuits are employed. Each separate circuit consists of a controlling stage oscillating at a given natural frequency which corresponds to the vibration frequency of the highest note of a given letter in the chromatic scale. Thus, there is a circuit producing outputs corresponding to the tone frequencies of all C notes, a circuit producing outputs at the tone frequencies of all C# notes, a circuit producing outputs corresponding to the tone frequencies of all D notes, and so on, to and inclusive of a circuit producing outputs at the tone frequencies of all B notes. As the range of the herein described instrument is limited to sixty notes, there will be sixty individual oscillator stages or five stages per separate divider circuit of the twelve similar circuits. In the herein disclosed embodiment of my invention, the twelve divider circuits are arranged in three groups of four similar circuits, each, such that one group consists of circuits respectively producing outputs for all C, C#, D and D# notes, a second group of circuits respectively producing outputs for all E, F, F# and G notes and a third group of circuits respectively producing outputs for all G#, A, A# and B notes. To avoid unduly complicating the herein disclosed electrical network I have disclosed but one circuit of each of said groups and have designated them C circuit, E circuit and G# circuit.

Referring to the group comprising the C, C#, D and D# circuits, only the C circuit is shown. This comprises coupled stages C1, C2, C3, C4 and C5.

Of the group comprising the E, F, F# and G circuits, the drawings disclose only the E circuit which comprises coupled stages $E_1$, $E_2$, $E_3$, $E_4$ and $E_5$.

Of the third group which comprises circuits G#, A, A# and B, the drawings disclosed only the G# circuit, the same comprising stages G#1, G#2, G#3, G#4 and G#5.

Referring more particularly to the circuit comprising stages C1, C2, C3, C4 and C5, it is noted that said stages respectively have output terminals C1′, C2′, C3′, C4′ and C5′. Terminal C1′ has a resistance R1 in series; terminal C2′ a resistance R4 in series; terminal C3′, a resistance R7 in series; terminal C4′, a resistance R10 in series; terminal C5′, a resistance R13 in series.

The output of stage C2 is connected to terminal C1′ and C3′ by resistors R3 and R5. The output of stage C3 is connected to terminals C2′ and C4′ by resistors R6 and R8. The output of stage C4 is connected to terminals C3′ and C5′ by resistors R9 and R11, and as shown, the output of stage C5 is connected to terminal C4′ by resistor R12.

It follows from the above description that stages C1 and C5 are each thereof provided with a potential divider comprising two branch resistive output channels through which portions of a waveform of voltage is adapted to be concurrently conducted and that each stage C2, C3 and C4 has a potential divider comprising three branch resistive output channels. As each separate cascade of the twelve cascades herein employed is similarly designed, except as will be hereinafter pointed to, the resistances in the output channels of all similarly situated stages are designated by like reference characters and numerals.

Referring now to the manner of connecting the various stages in a keying and transmitting network, I have shown key-actuated switches of a keyboard employing sixty playing-keys. I have also shown a single key-actuated switch for the playing key for the last note in the top octave. It is noted that terminal C1′ connects to the movable contact element 14 of switch KC1; that terminal C2′ similarly connects with switch KC2 an octave above KC1; that terminal E1′ connects with switch KE1 and that terminal G#1 connects with switch KG#1. It accordingly follows that from terminal C1′ there will be impressed on switch KC1 a wave which is the sum of the coupled outputs of stages C1 and C2. Stage C1 provides a frequency equal to 65. cycles per second (basic 8-foot tone), stage C2 producing a frequency equal to 131. cycles per second (an octave above C1). Similarly, the E1′ terminal from stages E1 and E2 impress on switch KE1 a wave which is the sum of waves corresponding to 8-foot and 4-foot tones. In like manner, terminal G#1 conducts to switch KG#1 a wave which is the sum of 8-foot and 4-foot tones. In like manner all remaining switches comprising the lowest octave will be similarly connected by their leads to their respective stages.

Regarding the three intermediate octaves, each playing-key will be supplied with a wave which is the sum of 8-foot, 4-foot and 16-foot tones. Only a connection to one switch, namely KC2 of the three intermediate octaves is shown, but on referring thereto it is noted that terminal C2′ which connects therewith conducts thereto a wave which is the sum of the outputs of stages C1, C2 and C3, whereby the resultant tone will be a mixture of 4-foot, 8-foot and 16-foot tones. All intermediate switches comprising the three middle octaves will be similarly connected.

In order that there will be no "robbing" amongst divided portions of the output of any generator that is simultaneously drawn upon, the resistances in the output of each separate stage are high relative to the internal impedance of said stage and the impedance of the load circuit.

An important feature of the invention is the herein disclosed use of twelve divider or equivalent circuits for producing frequencies throughout a useful musical range, which circuits are arranged in groups, such that each separate group comprises a given number of similar circuits. [By this is meant that except that each separate circuit in any group furnishes its own or preassigned octavely related frequencies which correspond to the vibration frequencies of notes of the same letter of the chromatic scale, the resistances, coupling and tapering and anti-robbing of all circuits comprising any group are of the same values.] *By this is meant that except that each separate circuit in any group furnishes its own preassigned octavely related frequencies which correspond to the vibration frequencies of notes of the same letter of the chromatic scale, the coupling, tapering and anti-robbing resistances in all circuits of any one of the herein disclosed note groups of circuits are of like values at corresponding places in said circuits.* By the method employed the high frequency tone signals are increased in amplitude by lowering, in groups, the values of resistors R12 for the 4-foot outputs and R13 for the 8-foot outputs, which increase is necessary to compensate for the wave filters 16, 17 and 18 beyond the key switches.

The following table discloses the grouping of different sets of circuits and the various values of resistances in the outputs of the different stages:

*Table of values and divider circuit grouping*

| Footage | Terminal | Resistors | Group 1 C, C#, D, D# | Group 2 E, F, F#, G | Group 3 G#, A, A#, B |
|---|---|---|---|---|---|
| 8-foot | 1 | R1 | 470 K | 470 K | 470 K. |
| | 2 | R4 | 470 K | 470 K | 470 K. |
| | 3 | R7 | 470 K | 470 K | 470 K. |
| | 4 | R10 | 470 K | 470 K | 470 K. |
| | 5 | R13 | 220 K | 150 K | 100 K. |
| 16-foot | 2 | R2 | 3.3 Meg | 2.2 Meg | 1.5 Meg. |
| | 3 | R5 | 820 K | 820 K | 820 K. |
| | 4 | R8 | 820 K | 820 K | 820 K. |
| | 5 | R11 | 820 K | 820 K | 820 K. |
| 4-foot | 1 | R3 | 680 K | 680 K | 680 K. |
| | 2 | R6 | 680 K | 680 K | 680 K. |
| | 3 | R9 | 680 K | 680 K | 680 K. |
| | 4 | R12 | 330 K | 220 K | 150 K. |

K is used to designate one thousand ohms—i. e. 470 K=470,000 ohms.

Meg. is used to designate one million ohms—i. e. 1.5 Meg.=1,500,000 ohms.

While I have selected a practical grouping of the divider circuits, the total number of which consists of twelve such circuits arranged in groups or four circuits each, this is by way of illustration and in order that any person skilled in the art can satisfactorily practice the invention. I do not intend, however, to be limited in this respect as the number of individual tone frequencies comprising any group will depend upon the number of octaves comprising a given note or frequency range, to which can be added the total number of outputs desired to be connected to the keying circuits.

All of the aforementioned switches connect to the common output 13, so that when any selected switch is in an "on" condition, the output of generators associated with said switch will be impressed on the wave filter system, thence impressed on the input circuit of the power amplifier 26 by selected actuation of the aforementioned switches 23. The wave filter system may be of any well known type so that the resultant tone will approximate a tone of any given timbre. The wave filter system shown and fully described in my Patent No. 2,403,090 is entirely suitable for the purpose of my invention.

The fundamental frequencies indicated upon the accompanying drawings are related to the standard frequency A=440 c/s.

Particular stress is placed upon those features of my invention which consist in providing a potential divider in the output of each separate electron discharge device as provided for by the impedances in said output.

As will be observed by referring to the table of values and divider circuit grouping, the 16-foot signals supplying the next to lowest octave switches are attenuated increasingly as the frequency lowers in three steps, each step comprising four notes. In addition to providing tonal balance this feature serves to blend the amplitudes of the signal so that no abrupt change is noticed at the junction where the 16-foot signals are omitted, as between key KC1 and key KC2.

At the other end of the keyboard, however, the 4-foot generator signals are not attenuated, in fact, they are increased slightly, in groups, within the next to the lowest octave. The reason for this is that the attenuation in the further network more than compensates for the increasing generator signals.

[Tone frequency sources as used herein shall be construed to mean any well known electron discharge device or generator for producing an output wave of predetermined audio frequency which is preferably but not necessarily a wave rich in its harmonic composition.]

*While I have pointed particularly to waveform generators of the type yielding complex waveforms comprising both even and odd harmonics, generators producing waveforms that are not as rich in harmonics may also be used. In the latter case however, there will not be the richness of tone that is possible of attainment from mixtures each comprising a long series of both even and odd harmonics.*

While I have disclosed herein a system for frequency generators consisting of separate frequency having circuits, any of the well known frequency multiplying circuits may be used to full advantage.

I claim:

1. A musical instrument of the class employing a keyboard, each playing-key of which is provided with a single electric switch which is actuable from an "off" condition when the key is elevated to an "on" condition when the key is lowered; said instrument comprising a plurality of divider circuits, each comprising oscillator stages connected in cascade and including a controlling first stage operating at a given natural frequency and a plurality of controlled stages, said controlling stage and said controlled stages respectively producing output waves at octave separation and each having an output terminal permanently connected to an assigned on of said switches; [and impedances in each separate divider circuit, said impedances connecting preassigned stages with preassigned output terminals, whereby the wave impressed on any single terminal and on any single electric switch is the sum of output waves of at least two of said stages.] *and a coupling including impedances in each separate divider circuit, said impedances connecting preassigned stages with preassigned output terminals, whereby the wave impressed on each of certain of said terminals is a complex mixture of at least a first wave, a second wave and a third wave and wherein the second and third waves have fundamental frequencies which are respectively higher and lower in the gamut of said keyboard than the fundamental frequency of said first wave.*

2. A musical instrument of the class employing a work circuit, and a keyboard, each playing-key of which is provided with a single electric switch which is actuable from an "off" condition when the key is elevated to an "on" condition when the key is lowered; said instrument comprising a plurality of sources respectively producing output waves [at tone frequencies for more than two octaves of notes of a musical scale, each of said source having an output terminal permanently connected to a preassigned one of said switches and provided with an impedance of given value, said source also having an output path in addition to the path provided by said terminal, the same connected to the output terminal of another one of said sources, whereby in addition to conduction of the output from any source to a preassigned switch there is conducted to the same switch the output wave from another source.] *embracing a range of more than two octaves, said waves each consisting of a series of even and odd harmonics, each of said sources having an output terminal connected to a preassigned one of said switches and provided with an impedance of given value, each of said sources also having an output path in addition to the path provided by said terminal, said additional path connected to the output terminal of another one of said sources, whereby in addition to conduction of the output from any source to a preassigned switch there is conducted to the same switch the output wave from another source.*

3. A musical instrument as set forth in claim 2, wherein the additional output path from each separate source has an impedance, the value of which is different from that of the impedance of the output terminal of the same source.

4. A musical instrument as set forth in claim 2, wherein the additional output path from each separate source has an impedance, the value of which is different from that of the impedance of the output terminal of the same source and wherein both said impedances are high relative to the impedance of said source.

5. An electrical musical instrument of the class employing a work circuit and a keyboard, each separate playing key of which is provided with a single electric switch which is actuable thereby from an "off" condition when the key is elevated to an "on" condition when the key is lowered; said instrument comprising a plurality of sources respectively producing complex output waves at tone frequencies for more than two octaves of notes of a musical scale, [each of said sources having an output terminal permanently connected to a preassigned one of said switches and provided with an impedance of predetermined value, said source also having an output path in addition to the path provided by said terminal and having an impedance of predetermined value, said additional path connected to the output terminal of another one of said sources, whereby in addition to conduction of the output from any source to a preassigned switch there is conducted to the same switch the output wave from another source, said switches connected with said load circuit and said impedances in the paths of any source, each being high relative to the impedance of said source and the impedance of said load circuit.] *each of said waves consisting of both the even and odd harmonics of a given fundamental tone frequency, each of said sources having an output terminal permanently*

*connected to a preassigned one of said switches and provided with an impedance of predetermined value, said additional path connected to the output terminal of another one of said sources, whereby in addition to conduction of the output from any source to a preassigned switch there is conducted to the same switch the output wave from another source, said switches connected with said load circuit, said impedances in the paths of any source, each being high relative to the impedance of said source and the impedance of said load circuit.*

6. An electrical musical instrument as set forth in claim 5, wherein said work circuit includes means for repeating the output [of] waves impressed thereon as waves differing therefrom in their harmonic composition.

7. An electrical musical instrument as set forth in claim 5, wherein said work circuit includes means for repeating output waves impressed thereon as waves differing therefrom in their harmonic composition and wherein said work circuit has means for translating said repeated waves into audible sounds [and] of desired volume.

8. A musical instrument of the class employing a keyboard, each playing-key of which is provided with a single electric switch, actuable by the key from an "off" condition of the switch when the key is elevated to an "on" condition thereof when the key is lowered; said instrument comprising a plurality of sources [of complex audio signals having the vibration frequencies of different notes of a musical scale, impedances connecting each separate switch to preassigned ones of said sources, and means including a conductor connected in common to all of said switches for transmission of signals to an electroacoustical translating system.] *producing audio signals having the vibration frequencies of different notes of a musical scale, each of said waves consisting of a given fundamental and both even and odd harmonics of said fundamental, impedances connecting each separate switch to preassigned ones of said sources, and means including a conductor connected in common to all of said switches for transmission of signals to an electroacoustical translating system.*

9. A musical instrument as set forth in claim 8, wherein said sources comprise high vacuum tubes providing separate sets of tubes in which the tubes of each set are connected in cascade and respectively produce audio signals at octave separation.

10. In a musical instrument employing wave filters and sources respectively producing complex waveforms of audio signals havings the tone frequencies of different notes of a musical scale, [a playing-key actuated switch for and connected to each separate one of the aforementioned sources, impedances coupling preassigned sources with preassigned switches such that signal voltages conducted to any individual switch is the sum of signal voltages from respective sources, a common conductor connected to all of said switches and to said filters, and means enabling selective conduction of the outputs of said filters to the input circuit of an electroacoustical translating system.] *and wherein said waveforms each comprise both even and odd harmonics of a given fundamental tone frequency, a playing-key actuated switch for and connected to each separate one of the aforementioned sources, impedances coupling preassigned sources with preassigned switches such that signal voltages conducted to any individual switch is the sum of signal voltages from respective sources, a common conductor connected to all of said switches and to said filters, and means enabling selective conduction of the outputs of said filters to the input circuit of an electroacoustical translating system.*

11. A musical instrument as set forth in claim 10, wherein the values of said impedances are such that the relative amplitudes of signal voltages conducted to a switch from coupled sources are relatively different.

12. In a musical instrument employing sources respectively producing audio signals at the tone frequencies of sequentially related [tone signals for a range of more than two octaves; said instrument comprising in combination with each separate one of said sources a single electric switch adapted to be actuated by a playing-key of a keyboard, impedances of predetermined values coupling the outputs of preassigned sources to preassigned switches such that there is selectively impressed on any single switch at least two signals of different frequency, said impedances serving to fix the amplitude relation between signals of different frequency impressed on any switch.] *musical tones for a range of more than two octaves, which signals each thereof comprise a given fundamental and both even and odd harmonics of said fundamental, said instrument comprising in combination with each separate one of said sources a single electric switch adapted to be actuated by a playing-key of a keyboard, impedances of predetermined values coupling the outputs of preassigned sources to preassigned switches such that there is selectively impressed on any single switch at least two signals of different frequency, said impedances serving to fix the amplitude relation between signals of different frequency impressed on any switch.*

13. In a musical instrument of the class employing a keyboard, each playing-key of which is provided with a single electric switch actuable from an "off" condition when the key is elevated to an "on" condition when the key is lowered, said instrument comprising a plurality of sources of audio signals having the vibration frequencies of musical notes for a range of more than two octaves, each of said sources having a potential divider providing a plurality of parallel paths, each having an impedance of predetermined value, a switch for and individual to each of the sources, said paths connecting individual switches with a plurality of preassigned sources such that there is impressed on each individual switch a waveform of voltage which is the sum of signal voltages from said plurality of sources. [the values of said impedances in said voltage dividers being predetermined so that the amplitude of one frequency component impressed on a switch is greater than that of another frequency component impressed on the same switch.] *the values of said impedances in said voltage dividers being predetermined so that the amplitude of the signal impressed on a switch from one source is greater than that of the signal impressed on the same switch from another source.*

14. A musical instrument as set forth in claim 13, wherein a load circuit is included and a common conductor connects all of said switches to said circuit, the impedance of said load circuit being low relative to the impedances in said parallel paths.

15. A musical instrument as set forth in claim 13, wherein said sources are connected in sets in which the sources of each separate set are coupled in cascade.

16. A musical instrument of the class employing a keyboard, each playing-key of which is provided with a single electric switch which is actuable thereby from an "off" condition when the key is raised to an "on" condition when the key is lowered; said instrument comprising *at least* as many tone frequency sources as there are playing-keys in said keyboard, each of which produces an audio signal corresponding to the vibration frequency of the note associated with a preassigned playing-key, an electrical network in which said switches and said sources are connected, said network including output terminals permanently connecting given ones of said sources to switches of preassigned playing-keys of said keyboard, paths connecting preassigned sources with preassigned terminals, and impedances in said paths and an impedance in each of said terminals for predetermining the relative amplitude of signals impressed on any switch from sources common thereto, and an output conductor common to all of said switches and adapted to be connected to an audio signal translating device.

[17. A musical instrument as set forth in claim 2, wherein the impedances interconnecting preassigned ones of said devices with preassigned ones of said terminals are in groups in which the impedance comprising a particular group are the same but different from the impedances of another group.]

18. A musical instrument of the class employing a keyboard, each playing-key of which is provided with a single electric switch which is actuable from an "off" condition when the key is elevated to an "on" condition when the key is lowered; said instrument comprising a plurality of electron-discharge devices respectively providing sources producing output waves of notes of a musical scale, each of said electron-discharge devices having an output terminal connected to a preassigned one of said switches, and impedances interconnecting preassigned ones of said devices with preassigned ones of said output terminals, whereby the output wave at said preassigned terminals is the sum of output waves from a predetermined number of said electron-discharge devices, the impedances interconnecting the preassigned terminals of some of said electron-discharge devices being the same but different from the impedances of others of said devices.

19. A musical instrument of the class employing a keyboard, each playing-key of which is provided with an electric switch which is operable from an "off" condition when the key is elevated to an "on" condition when the key is depressed, an audio amplifier having a load speaker connected in its output circuit; said instrument comprising, twelve sets of tone frequency oscillators, the oscillators of each separate set connected in cascade to produce octavely related tone frequencies, said sets of cascaded oscillators arranged in separate note groups, the oscillators of each set of cascaded oscillators having an output terminal connected in circuit with a preassigned one of said electric switches; resistive means for each set of cascaded oscillators, said resistive means comprising resistances interconnecting the output terminals of the oscillators to each of said sets, the resistances in any given group of said cascades being the same but different from the resistances of any other group of cascades, a filter system having an output conductor connected to the input circuit of said audio amplifier, and a common conductor connecting all of the aforementioned electric switches to the input side of said filter system.

*20. A musical instrument as set forth in claim 18, wherein the impedances interconnecting preassigned ones of said devices with preassigned ones of said terminals are in gronps in which the values of the impedances comprising a particular group are the same but different from the values of the corresponding impedances of another group..*

*21. In a musical instrument, a set of tone signal generators respectively producing output waveforms of tone signals for a frequency range of more than two octaves of notes of a musical scale, said waveforms each consisting of a given fundamental and even and odd harmonics thereof, a set of key actuated electric switches, and coupling means connecting each individual switch of said set of switches to preassigned ones of said generators, said coupling means comprising conductors having impedances for predetermining the magnitudes of tone signals conducted to said translating means.*

*22. In a musical instrument, a plurality of tone signal generators respectively producing output waveforms of tone signals for a frequency range of more than two octaves of notes of a musical scale, said waveforms each consisting of a fundamental of a tone signal of a given note letter, a set of key actuated electric switches, signal translating means connected in circuit with said switches, and coupling means connecting each of said generators to preassigned ones of said switches, said coupling means comprising conductors having impedances for predetermining the magnitudes of tone signals conducted to said translating means, and wherein the said impedances of said conductors connecting generators having the same note letter and their associated switches are the same in value as the corresponding impedances associated with at least one other generator of a different note letter but different from corresponding impedances of another generator associated with a still different note letter.*

MERWIN J. LARSEN.

REFERENCES CITED

The following references are of record in the file of this patent or the original patent:

UNITED STATES PATENTS

| Number | Name | Date |
|---|---|---|
| 2,203,432 | George | June 4, 1940 |
| 2,227,100 | Manatt | Dec. 3, 1940 |
| 2,233,948 | Kock | Mar. 4, 1941 |
| 2,403,090 | Larsen | July 2, 1946 |